US011236991B2

(12) United States Patent
Rammos

(10) Patent No.: US 11,236,991 B2
(45) Date of Patent: Feb. 1, 2022

(54) METHOD FOR DETERMINING A CURRENT DISTANCE AND/OR A CURRENT SPEED OF A TARGET OBJECT BASED ON A REFERENCE POINT IN A CAMERA IMAGE, CAMERA SYSTEM AND MOTOR VEHICLE

(71) Applicant: Connaught Electronics Ltd., Taum (IE)

(72) Inventor: Perikles Rammos, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 897 days.

(21) Appl. No.: 14/449,200

(22) Filed: Aug. 1, 2014

(65) Prior Publication Data

US 2015/0035973 A1    Feb. 5, 2015

(30) Foreign Application Priority Data

Aug. 2, 2013    (DE) ...................... 10 2013 012 930.3

(51) Int. Cl.
| | |
|---|---|
| *G01B 11/14* | (2006.01) |
| *G01S 11/12* | (2006.01) |
| *G01C 3/06* | (2006.01) |
| *G06T 7/269* | (2017.01) |
| *G06T 7/593* | (2017.01) |

(52) U.S. Cl.
CPC ............... *G01B 11/14* (2013.01); *G01C 3/06* (2013.01); *G01S 11/12* (2013.01); *G06T 7/269* (2017.01); *G06T 7/593* (2017.01); *G06T 2207/10021* (2013.01); *G06T 2207/30244* (2013.01); *G06T 2207/30261* (2013.01)

(58) Field of Classification Search
None
See application file for complete search history.

(56) References Cited

U.S. PATENT DOCUMENTS 6,477,260 B1 * 11/2002 Shimomura ......... H04N 13/239
382/106
2004/0066952 A1 * 4/2004 Hasegawa ............ G06K 9/6255
382/103

(Continued)

OTHER PUBLICATIONS

J. Alvarez, A. Lopez, "Road Detection Based on Illuminant Invariance", IEEE Transactions on Intelligent Transportation Systems, 2010 (10 pages).

*Primary Examiner* — Shawn S An

(74) *Attorney, Agent, or Firm* — Osha Bergman Watanabe & Burton LLP

(57) ABSTRACT

A method for determining a current distance and/or a current speed of a target object relative to a motor vehicle based on an image of the target object, in which the image is provided by a camera of the motor vehicle, where characteristic features of the target object are extracted from the image and a reference point associated with the target object is determined based on the characteristic features for determining the distance and/or the speed, wherein the distance and/or the speed are determined based on the reference point, and a baseline is determined in the image based on the characteristic features, which is in a transition area from the depicted target object to a ground surface depicted in the image, and a point located on the baseline is determined as the reference point.

10 Claims, 5 Drawing Sheets

(56) References Cited

U.S. PATENT DOCUMENTS

Figure 1:
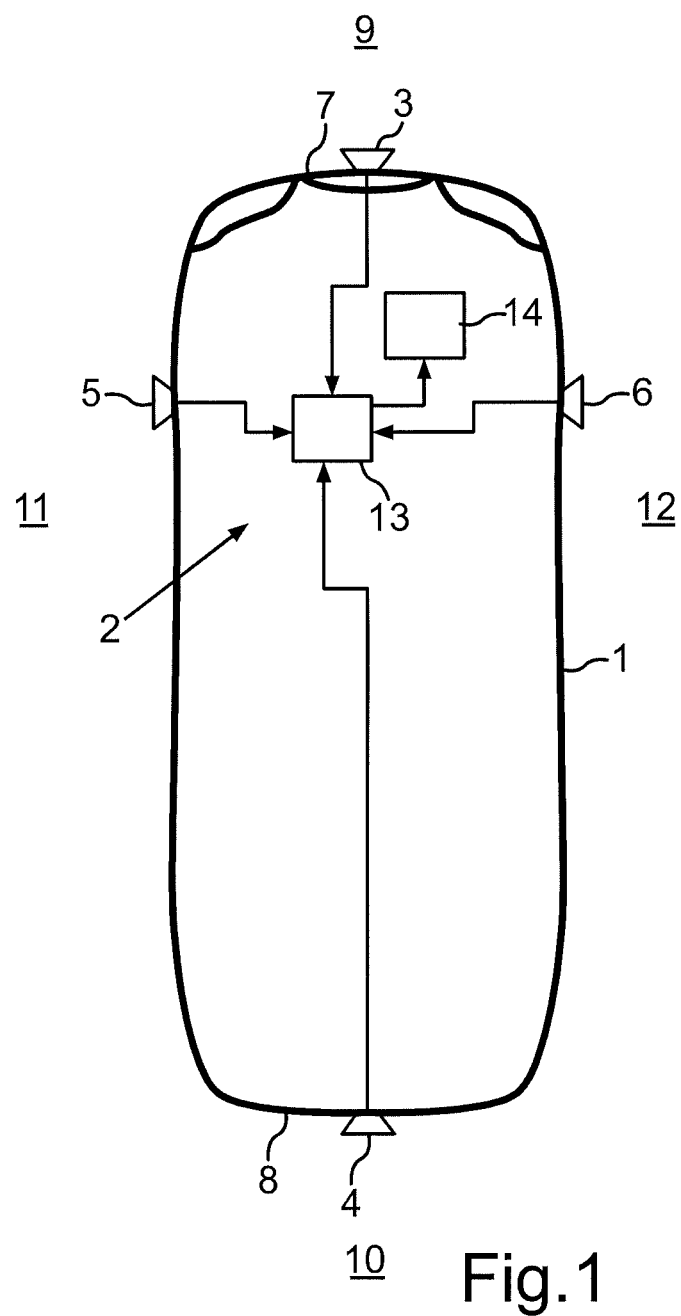

| | | | | |
|---|---|---|---|---|
| 2009/0169052 A1* | 7/2009 | Seki | ............... | G06T 7/74 |
| | | | | 382/103 |
| 2010/0082238 A1* | 4/2010 | Nakamura | ............ | G01C 21/32 |
| | | | | 701/532 |
| 2010/0246901 A1* | 9/2010 | Yang | ............... | B60R 1/00 |
| | | | | 382/107 |
| 2012/0027258 A1* | 2/2012 | Uchida | ............ | G06T 7/20 |
| | | | | 382/103 |
| 2012/0314073 A1* | 12/2012 | Shimoda | ............ | G06T 7/80 |
| | | | | 348/148 |
| 2013/0236107 A1* | 9/2013 | Fukaya | ............ | G06T 7/246 |
| | | | | 382/201 |
| 2013/0322697 A1* | 12/2013 | Grindstaff | ............ | G06T 7/246 |
| | | | | 382/107 |
| 2014/0169627 A1* | 6/2014 | Gupta | ............ | G06K 9/00805 |
| | | | | 382/103 |
| 2015/0204652 A1* | 7/2015 | Olsson | ............ | G01S 3/786 |
| | | | | 356/72 |

* cited by examiner

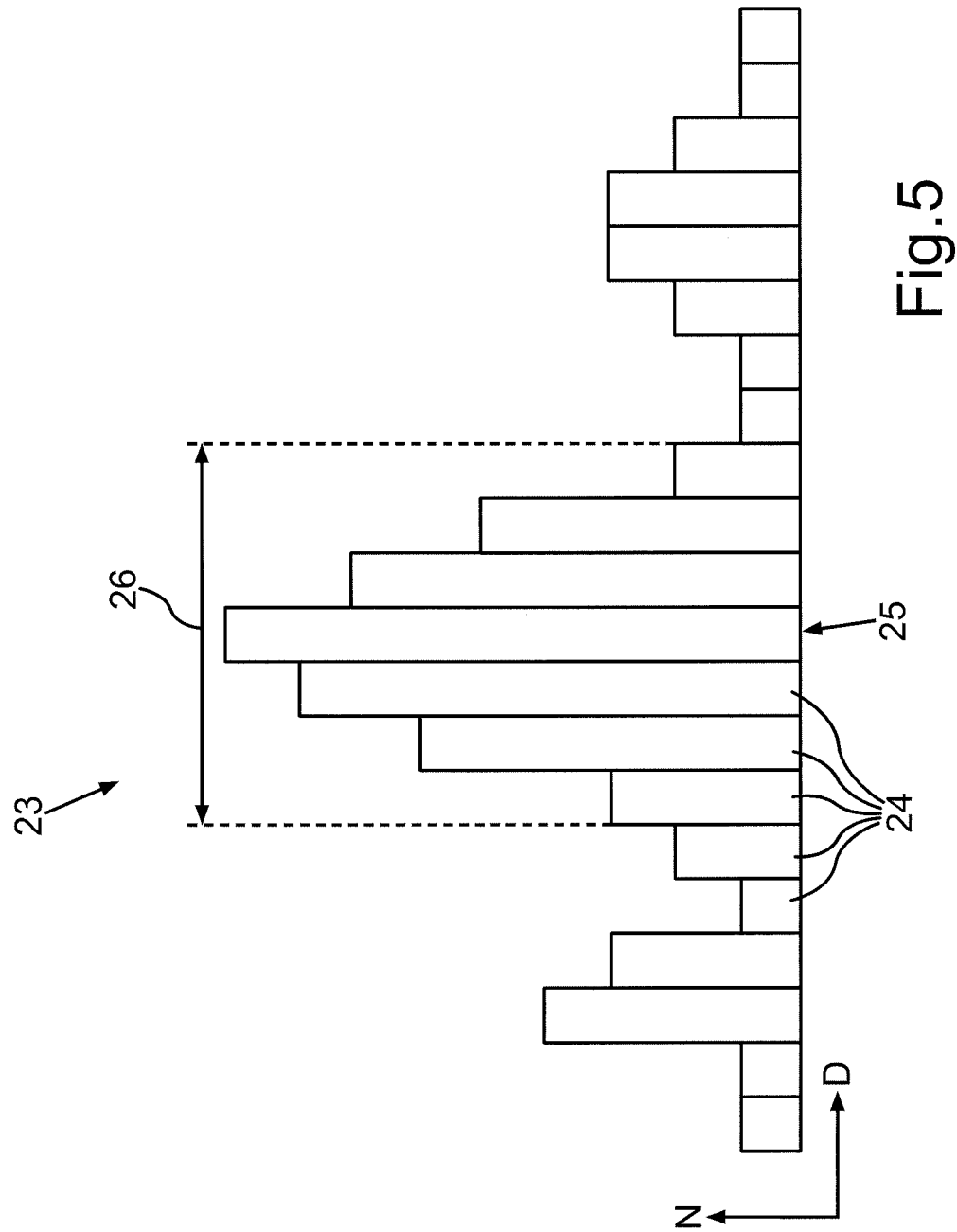

METHOD FOR DETERMINING A CURRENT DISTANCE AND/OR A CURRENT SPEED OF A TARGET OBJECT BASED ON A REFERENCE POINT IN A CAMERA IMAGE, CAMERA SYSTEM AND MOTOR VEHICLE

The invention relates to a method for determining a current distance and/or a current speed of a target object relative to a motor vehicle based on an image of the target object, wherein the image is provided by means of a camera of the motor vehicle, wherein characteristic features of the target object are extracted from the image and a reference point associated with the target object is determined based on the characteristic features for determining the distance and/or the speed, and wherein the distance and/or the speed are determined based on the reference point. In addition, the invention relates to a camera system for performing such a method as well as to a motor vehicle with such a camera system.

Camera systems for motor vehicles are already known from the prior art. As is known, several cameras can be attached to a motor vehicle, which capture the environment of the motor vehicle and provide images of the environment. The provided images can be communicated to an image processing device being able to provide very different functionalities in the motor vehicle based on the image data. Thus, the images of the cameras can for example be displayed on a display. In this context, it is already prior art to generate a so-called "bird eye view", i.e. a plan view presentation showing a plan view of the motor vehicle and the environment of the vehicle from a bird's eye view. Such a plan view presentation can then be displayed on the display and thus facilitates the estimation of the distances between the motor vehicle and obstacles located in the environment to the driver.

Besides the presentation on a display, further functionalities can also be provided based on the images. These functionalities can for example include obstacle recognition, for example, in order to be able to warn the driver of a possible collision. It is already prior art to detect a target object—for instance another vehicle—in the images of a camera and to track it over a temporal sequence of images such that the respectively current position of this target object relative to the motor vehicle is known. Besides the position, the relative speed of this target object with respect to the motor vehicle can also be determined. For this purpose, usually, characteristic features are extracted from the images, such as for example so-called Harris points and/or FAST features. In order to be able to track the target object, for example, the Lukas Kanade method can be used. Here, the characteristic features of an image are each associated with a corresponding feature of a subsequent image such that feature pairs are formed. Then, a so-called optical flow vector can be determined to each feature pair, which describes a movement of the respective features over the images. The optical flow vector characterizes the direction of movement of the respective feature on the one hand; such a flow vector also indicates the speed, which depends on the length of the flow vector, on the other hand.

The determination of the distance of a target object based on the images and/or the determination of the relative speed thus present a relatively great challenge in the prior art. Namely, overall, very much characteristic features of the target object exist, and a reference point has to be found, which is representative of the target object and can be taken as a basis for determining the distance and/or the relative speed. In the prior art, the reference point is also referred to as a "ground point", which represents a pixel of the image, which is anchored to the depicted target object and thus moves with the target object, but is already associated with the ground or with the depicted roadway. Such a reference point is usually detected for each target object and then serves as a basis for determining the distance and/or the relative speed.

In the prior art, the determination of the reference point is associated with relatively great effort. The known methods are based on the illuminant invariance, as it is for example described in the following document: Road Detection Based on Illuminant Invariance, J. Alvarez, A. Lopez, IEEE TRANSACTIONS ON INTELLIGENT TRANSPORTATION SYSTEMS 2010. In this method, pixels can be detected, which uniquely are associated with the roadway. In other words, it is differentiated between pixels associated with the roadway on the one hand and pixels associated with target objects on the other hand.

It is an object of the invention to demonstrate a solution, how in a method of the initially mentioned kind the reference point can be determined reliably and without much effort for determining the relative speed and/or the distance of the target object.

According to the invention, this object is solved by a method, by a camera system as well as by a motor vehicle having the features according to the respective independent claims. Advantageous implementations of the invention are the subject matter of the dependent claims, of the description and of the figures.

A method according to the invention serves for determining a current distance of a target object from a motor vehicle and/or a current relative speed between target object and motor vehicle based on an image of the target object, in particular based on a sequence of images of the target object. The image is provided by means of a camera of the motor vehicle and characteristic features of the target object are extracted from the image, such as for example Harris points and/or FAST points. For determining the distance and/or the speed, a reference point associated with the target object (the so-called "ground point") is determined based on the characteristic features, wherein the distance and/or the speed are determined based on the reference point. According to the invention, it is provided that a baseline is first defined in the image based on the characteristic features, which is in a transition area from the depicted target object to a ground surface (for example roadway) depicted in the image, and a point located on the baseline is determined as the reference point.

In this manner, the reference point can be particularly precisely and fast found for determining the distance and/or the speed without having to implement computationally expensive and complex algorithms, which are based on the illuminant invariance. Namely, such a baseline can be determined in the transition between target object and ground surface without much effort, and the reference point can then be defined on this baseline. Such a method can be implemented with particularly low effort on the one hand, the method requires little computational power and thus can also be advantageously implemented in so-called embedded systems in motor vehicles on the other hand.

Preferably, the camera is an optical image capturing device, which is able to detect light in the spectral range visible to the human and thus provide images. For example, the camera can be a CCD camera or a CMOS camera. The camera can also be a video camera providing a temporal sequence of images per second.

With respect to the arrangement of the camera on the motor vehicle, basically, various embodiments can be provided. For example, a camera can be disposed in the front area of the motor vehicle, for instance on the front bumper. Additionally or alternatively, a camera can also be disposed in the rear area, in particular on the rear bumper and/or on the tailgate. Additionally or alternatively, a camera can also be integrated in the left and/or in the right exterior mirror.

The computational effort in determining the baseline can be further reduced if the baseline is defined as a straight line.

It proves advantageous if the baseline is defined with an orientation, which corresponds to a direction of movement of the target object over a sequence of images and/or to a main extension direction of a roadway detected in the image. By detection of the direction of movement of the target object and/or by detection of the main extension direction of the roadway, the orientation of a bottom edge or a bottom side of the target object—in particular of a vehicle—and thus also the transition area in the image can be determined without much effort. Thus, it is possible to precisely determine the orientation of the transition from the target object to the ground surface.

In detail, the determination of the orientation of the baseline in the image can be performed as follows:

The characteristic features of the target object can be tracked over a sequence of images. Herein, respective optical flow vectors can be determined to the characteristic features, the directional values of which characterize a direction of movement of the respective feature over the sequence. The orientation of the baseline can then be determined depending on the directional values of the optical flow vectors. Such an approach ensures accurate determination of the current direction of movement of the target object and accordingly precise and simple determination of the orientation of the baseline in the image.

A subset of the directional values can also be selected from the directional values of the optical flow vectors by means of filtering, and the orientation of the baseline can then be determined depending on the selected subset of the directional values. In other words, multiple directional values of the flow vectors can be filtered out such that exclusively the selected subset is used for determining the orientation of the baseline. This increases the accuracy in determining the current direction of movement of the target object over the sequence of images. Therein, this embodiment is based on the realization that the optical flow vectors of a target object moving in the environment of the motor vehicle also can have different directional values, for instance due to optical effects such as for example due to parallax. This then influences the accuracy of the determination of the actual direction of movement of the target object. In order to prevent this influence, only a subset of the directional values is selected and taken as a basis for determining the orientation of the baseline.

Particularly preferably, the filtering is performed by means of a histogram. Thus, the filtering can be performed particularly reliably and precisely and without much computational effort.

For providing the histogram, a plurality of intervals of values for the directional values can be defined, and the number of the directional values can be determined to each interval of values, which are within the respective interval of values. Then, the filtering can include that a main interval is detected, which includes the greatest number of directional values. For the subset for determining the orientation of the baseline, then, exclusively those directional values can be selected, which are in the main interval, in particular in the main interval and additionally in preset intervals of values around the main interval. In this manner, directional values can be found, which are in a tolerance range around the most frequent directional value, while the directional values outside of this tolerance range can be filtered out.

As the orientation of the baseline, preferably, an average value of the selected subset of the directional values is calculated. Optionally, the directional values can be weighted with respective weighting factors in calculating the average value. These weighting factors can be determined depending on in which interval of values of the histogram the respective directional value is located. It can be provided that the weighting factor for the main interval of the histogram is greater than the weighting factors of the adjacent intervals of values. For example, the relation can apply that the farther the interval of values is from the main interval, the lower is the weighting factor.

Alternatively to the histogram, also other methods can be used for filtering of the flow vectors. For example, it is possible to define a minimum and maximum angle boundary value, e.g. by explicit parameters.

Preferably, in determining the baseline, first, an orientation of the baseline and subsequently a position of the baseline in the image are determined. The determination of the position can include that that feature is detected as the ground feature from the characteristic features of the target object, which represents an exterior (outer) feature of the target object in the direction perpendicular to the already determined orientation of the baseline, i.e. in particular a feature closest to the depicted ground surface in the direction perpendicular to the orientation of the baseline. Then, the position of the baseline is determined such that the baseline extends through the ground feature. This ground feature can for example be found such that an auxiliary line with the already determined orientation is defined and positioned in the image for example above the depicted target object. Then, distances of the characteristic features to this auxiliary line can be determined, and that feature can be selected as the ground feature, which has the greatest distance to the auxiliary line. Thus, a feature is found, which is in the transition area from the target object to the ground surface and thus presents a reliable position for the baseline.

If the baseline is defined, thus, the reference point can be determined as an intersection between the baseline and a lateral bounding line, which laterally bounds the target object in the image. Thus, a reference point or a "ground point" can be detected, which is anchored to the target object and already is associated with the ground or the roadway. Such a reference point presents a reliable basis for the determination of the distance and/or the speed of the target object.

Therein, the bounding line can be a line vertically oriented in the image, i.e. a line extending parallel to the y axis of the image frame. The bounding line can be defined such that it extends through a characteristic feature, which represents an exterior (outer) feature of the target object in the direction perpendicular to the vertical bounding line (i.e. in the direction of the x axis of the image frame) and thus is closest to the camera of the motor vehicle in particular in the direction perpendicular to the bounding line.

A camera system according to the invention for a motor vehicle includes a camera for providing an image of an environmental region of the motor vehicle as well as an electronic image processing device formed for performing a method according to the invention.

A motor vehicle according to the invention, in particular a passenger car, includes a camera system according to the invention.

The preferred embodiments presented with respect to the method according to the invention and the advantages thereof correspondingly apply to the camera system according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

Figure 2:
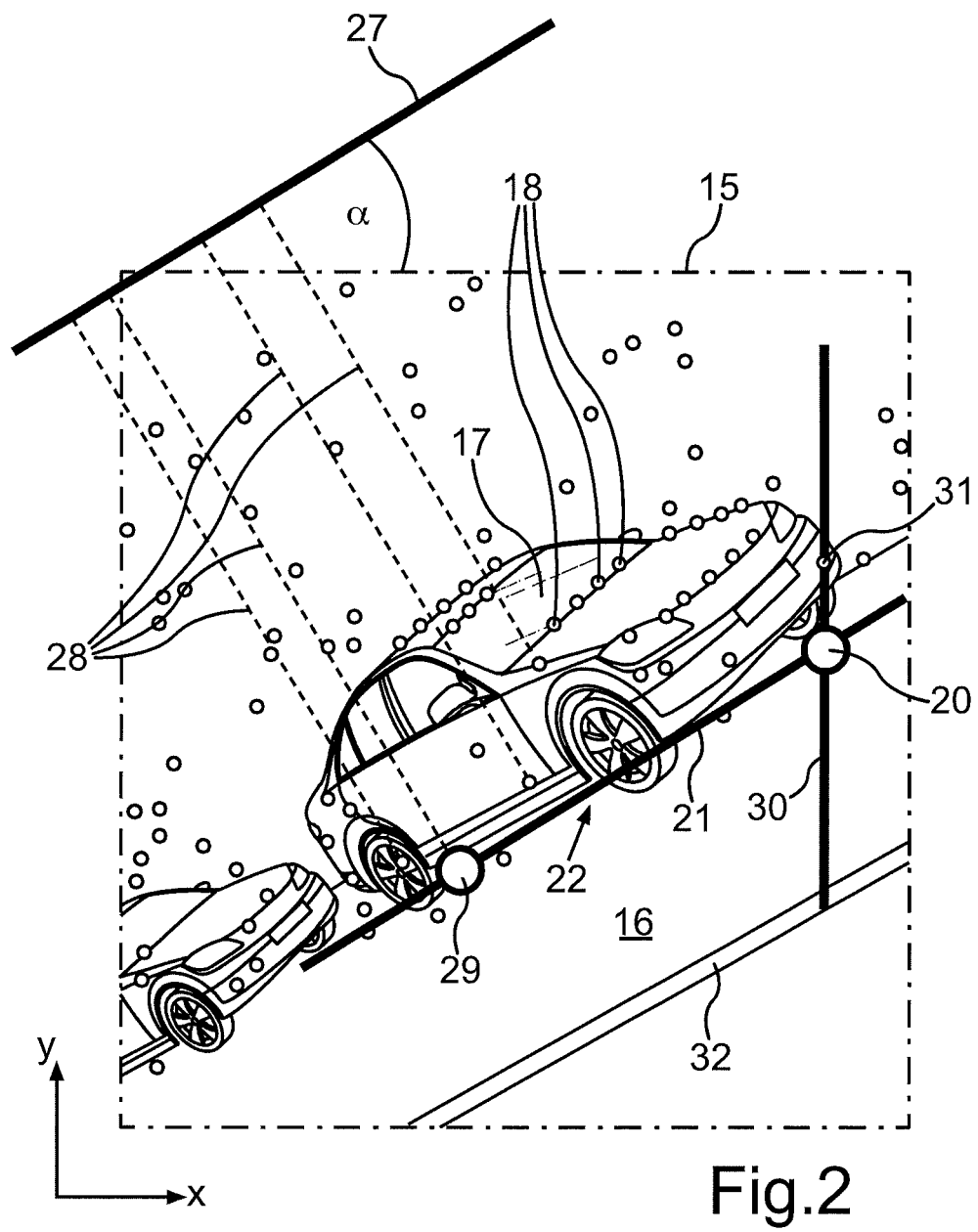
Figure 3:
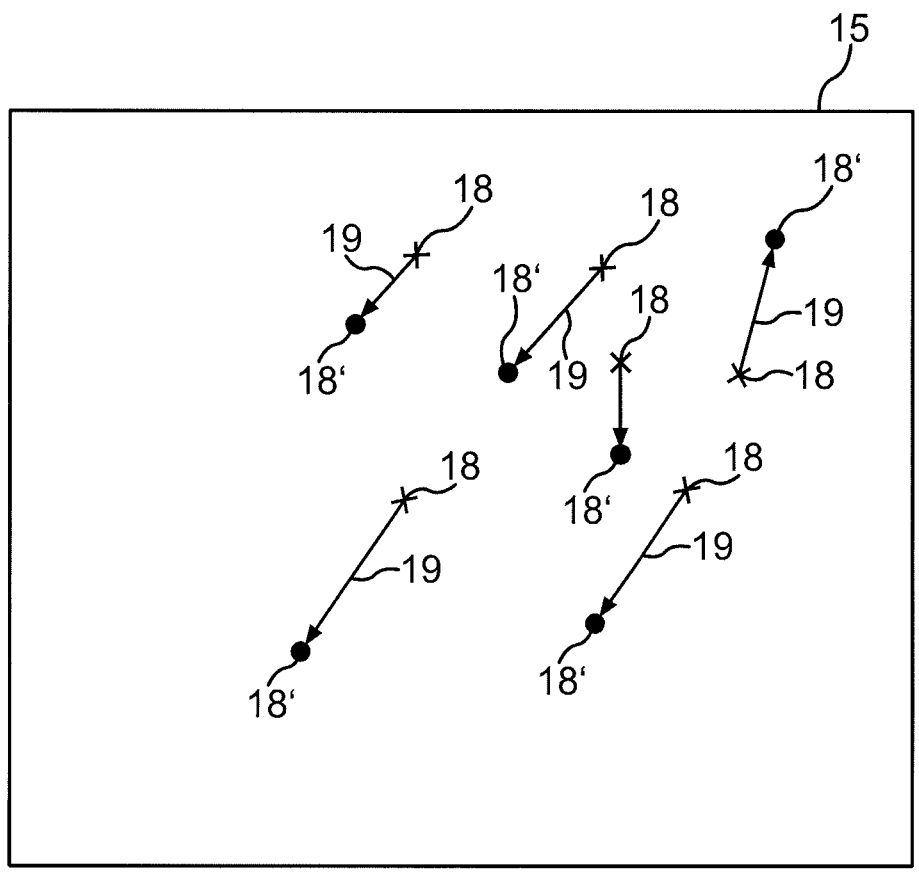
Figure 4:
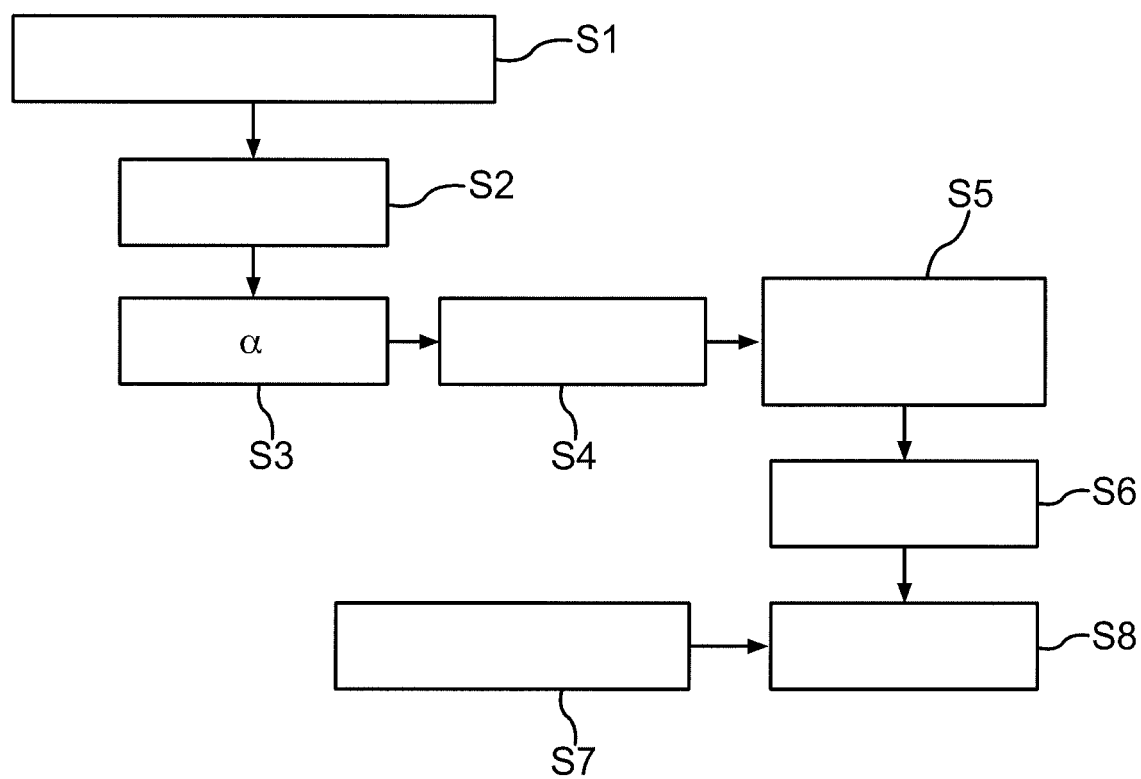

There show:

FIG. 1 in schematic illustration a motor vehicle with a camera system according to an embodiment of the invention;

FIG. 2 an exemplary image provided by means of a camera;

FIG. 3 in abstract illustration an image, wherein the optical flow method is explained in more detail;

FIG. 4 a flow diagram of a method according to an embodiment of the invention; and FIG. 5 an exemplary histogram for explaining the method.

A motor vehicle 1 illustrated in FIG. 1 is for example a passenger car. The motor vehicle 1 has a camera system 2 with for example four cameras 3, 4, 5, 6, which are disposed distributed on the motor vehicle 1. The cameras 3, 4, 5, 6 for example overall capture the environment around the motor vehicle 1. For example, the entire environment of the motor vehicle 1 and therefore a 360° image can be captured.

The camera 3 is a front camera disposed in the front area of the motor vehicle 1, for example on a front bumper 7. The camera 3 is therefore disposed on a front of the motor vehicle 1. The second camera 4 is for example a rearview camera, which is disposed in the rear area, for example on a rear bumper 8 or a tailgate. The lateral cameras 5, 6 can be integrated in the respective exterior mirrors.

The first camera 3 captures an environmental region 9 in front of the motor vehicle 1. Correspondingly, the camera 4 captures an environmental region 10 behind the motor vehicle 1. The lateral cameras 5, 6 each capture an environmental region 11 and 12, respectively, laterally besides the motor vehicle 1. The cameras 3, 4, 5, 6 can for example be so-called fish-eye cameras having a relatively wide opening angle, which for example can be in a range of values from 160° to 200°. The cameras 3, 4, 5, 6 can be CCD cameras or CMOS cameras. They can also be video cameras, which each are able to provide a plurality of frames per second. These images are communicated to a central electronic image processing device 13, which processes the images of all of the cameras 3, 4, 5, 6.

Optionally, the image processing device 13 can be coupled to an optical display device 14, which is for example an LCD display. Then, very different views can be presented on the display 14, which can be selected according to driving situation. For example, the image processing device 13 can generate an overall presentation from the images of all of the cameras 3, 4, 5, 6, which shows the motor vehicle 1 and its environment 9, 10, 11, 12 from a bird's eye view and thus from a point of view, which is located above the motor vehicle 1. Such a "bird eye view" is already prior art and can be generated by image processing.

In the images of the cameras 3, 4, 5, 6, the image processing device 13 can also identify target objects, in particular other vehicles. Therein, an exemplary image 15 of one of the cameras 3, 4, 5, 6 is shown in FIG. 2. As is apparent from FIG. 2, a roadway 16 is depicted in the image 15, on which a target object 17 is located and for example moves relatively to the motor vehicle 1. In the embodiment, the target object 17 is a motor vehicle. For identifying the target object 17, the methods already known from the prior art can be used, such as for example feature detection (for example FAST points or Harris points) in combination with clustering (for example DBSCAN or k-means), a so-called "blob" detection (for example LoG, DoG, DoH) or another algorithm, such as for example the AdaBoost.

Thus, characteristic features 18 are detected in the image 15, and those features 18 associated with the target object 17, are for example combined to a cluster. The target object 17 can then also be tracked over the sequence of the images, for example by means of the Lukas Kanade method.

With reference now to FIG. 3, to each characteristic feature 18 of an image 15, an associated feature 18' can be detected in a subsequent image. Thus, feature pairs 18, 18' are formed. As is apparent from FIG. 3, the features 18' are no longer in the same position in the image frame as the features 18. An optical flow vector 19 is respectively determined to each feature 18 of the target object 17 by means of the image processing device 13, which connects the feature 18 to the associated feature 18' from the subsequent image and is defined by its length on the one hand and by its direction on the other hand. Thus, the flow vector 19 characterizes the direction of movement and the speed of movement of the respective characteristic feature 18.

With reference again to FIG. 2, based on the characteristic features 18 of the target object 17, a reference point 20 is found in the image 15, which is then taken as a basis for determining a distance of the target object 17 from the motor vehicle 1 and/or determining a relative speed between target object 17 and motor vehicle 1. In order to determine this reference point 20 (also known under the designation "ground point"), first, a baseline 21 is defined, which is in a transition area 22 from the target object 17 to the roadway 16 and extends along this transition area 22, thus at the intersection between target object 17 and roadway 16. The exact determination of the baseline 21 and thus of the transition area 22 is configured as follows:

First, an orientation of the baseline 21 in the image 15 is determined, i.e. an angle $\alpha$ between the baseline 21 and the x axis of the image frame. In the determination of the orientation $\alpha$, a histogram 23 according to FIG. 5 is provided. To this, a plurality of intervals of values 24 is defined. Then, it is examined to each flow vector 19 of the target object 17, in which one of the intervals of values 24 the directional value of the respective flow vector 19 falls. Thus, the number N of the directional values D of the flow vectors 19 is counted to each interval of values 24, which are within the respective interval of values 24. Then, a main interval 25 is defined, which has the greatest number N of directional values D. Then, a range 26 is defined around this main interval 25, which for example includes the three nearest intervals of values 24 on both sides of the main interval 25. Alternatively, the range 26 can be defined using a fitting function, such as Gaussian or parabolic function, for instance. Then, an average value is calculated from the directional values D located in the range 26. Therein, weighting of the directional values D can optionally also be performed such that the directional values D of the flow vectors 19 are each multiplied by a weighting factor, which depends on in which one of the intervals of values 24 the respective directional value D is located. Therein, the greatest weighting factor can be selected for the main interval 25. Overall, the weighting factor can be proportional to the number N in the respective interval of values 24. Alternatively, the peak of the histogram could be used, which is also significantly less computationally expensive, albeit less accurate.

Then, the mentioned average value is used as the orientation α of the baseline 21 according to FIG. 2. If the orientation α is known, thus, an auxiliary line 27 is defined according to FIG. 2, which for example extends over the upper left corner of the image 15 and—generally speaking—is above the target object 17. Now, distances 28 between this straight auxiliary line 27 on the one hand and the characteristic features 18 of the target object 17 on the other hand are determined. That characteristic feature 29, which is in the greatest distance to the auxiliary line 27, is designated as a ground feature, i.e. a feature of the target object 17, which is closest to the roadway 16 and thus represents an exterior feature in the direction perpendicular to the orientation α.

The position of the baseline 21 is then defined by the ground feature 29 such that the baseline 21 extends through this ground feature 29. In other words, the auxiliary line 27 is displaced towards the ground feature 29.

Then, the reference point 20 is found on the baseline 21. For this purpose, first, a straight and vertical bounding line 30 is defined, which extends parallel to the y axis of the image frame. Therein, this bounding line 30 extends through a feature 31 of the target object 17, which represents an exterior feature of the target object 17 in x direction and thus in the direction perpendicular to the bounding line 30 and therefore is located outermost. This feature 31 can also be referred to as "farther-most feature". This feature 31 is closest to the camera of the motor vehicle 1—viewed in x direction.

The reference point 20 of the image 15 is then defined as the intersection of the baseline 21 with the bounding line 30.

Additionally or alternatively, the orientation α of the baseline 21 can also be determined based on a main extension direction 32 of the roadway 16. To this, the main extension direction 32 of the roadway 16 can first be detected based on the image 15. The direction 32 of the roadway 16 can be determined by a method such as Hough Transform, whenever visible and easily discernible.

A flow diagram of the above described method is shown in FIG. 4. In a first step S1, the filtering of the directional values D of the flow vectors 19 is effected by means of the histogram 23, as already explained above. In a further step S2, the average value of the selected directional values D is calculated. In a further step S3, the image processing device 13 determines the orientation α of the baseline 21, wherein the orientation α is equal to the average value. In a further step S4, the auxiliary line 27 is defined in the corner of the image 15, wherein the auxiliary line 27 has the orientation α. According to step S5, then, the maximum distance 28 and thus the ground feature 29 is found. The provision of the baseline 21 is then effected in a further step S6, namely such that the baseline 21 is a straight line, which has the orientation α and extends through the ground feature 29. According to step S7, the bounding line 30 is defined. The reference point 20 is then determined as the intersection of the baseline 21 with the bounding line 30 according to step S8.

As soon as the reference point 20 to the target object 17 is defined, the distance of the target object 17 (of the reference point 20) from the motor vehicle 1 and/or the relative speed (based on multiple images 15) can be determined.

The invention claimed is:

1. A method for determining a distance and/or a speed of a target object relative to a motor vehicle based on at least one image of the target object, the method comprising:
    extracting characteristic features of the target object from the at least one image, the at least one image being provided by a single camera of a plurality of cameras of the motor vehicle;
    determining a reference point associated with the target object based on the characteristic features;
    determining the distance and/or the speed of the target object based on the reference point; and
    determining a baseline in the at least one image based on the characteristic features, the baseline being in a transition area where the target object intersects a ground surface in the at least one image,
    wherein a point located on the baseline is determined as the reference point,
    wherein the baseline is a straight line in the at least one image and delimits a bottom edge of the target object, and
    wherein determining the baseline comprises:
        determining an orientation of the baseline in the at least one image,
        determining an auxiliary line along the orientation and disposed above the target object in the at least one image,
        measuring a distance in the at least one image between each of the characteristic features and the auxiliary line, and
        selecting, among the characteristic features, a ground feature that has a greatest distance to the auxiliary line,
        wherein the baseline is parallel to the auxiliary line and extends through the ground feature, and
    wherein the characteristic features of the target object are tracked over a sequence of images,
    wherein optical flow vectors are determined as being the characteristic features, directional values of the optical flow vectors characterizing a direction of movement for each of the characteristic features over the sequence, and
    wherein an orientation of the baseline is determined based on the directional values of the optical flow vectors.

2. The method according to claim 1,
    wherein a subset of the directional values is selected from the directional values of the optical flow vectors by filtering, and
    wherein the orientation of the baseline is determined based on the selected subset of the directional values.

3. The method according to claim 2, wherein the filtering is performed by means of a histogram.

4. The method according to claim 3,
    wherein, for providing the histogram, a plurality of value intervals for the directional values are defined,
    wherein, a number of the directional values is determined for each of the plurality of value intervals,
    wherein the filtering includes that a main interval is detected, the main interval having the greatest number of the directional values, and
    wherein for the subset for determining the orientation of the baseline, exclusively those directional values are selected that are in the main interval, in particular in the main interval and additionally in preset value intervals around the main interval.

5. The method according to claim 2, wherein an average value is calculated from the selected subset of the directional values as the orientation of the baseline.

6. The method according to claim 1, wherein the ground feature represents an exterior feature of the target object at a greatest distance, among the characteristic features, from the auxiliary line in a direction perpendicular to the orientation of the baseline.

7. The method according to claim 1, wherein the reference point is determined as an intersection between the baseline and a lateral bounding line, which laterally bounds the target object in the image.

8. The method according to claim 7, wherein the bounding line is a line vertically oriented in the image, which extends through a characteristic feature, which represents an exterior feature of the target object in a direction perpendicular to the vertical bounding line.

9. A camera system for a motor vehicle comprising:
- a camera that provides at least one image of an environmental region of the motor vehicle; and
- an image processing device configured to perform the method according to claim 1.

10. A motor vehicle including the camera system according to claim 9.

* * * * *